(12) United States Patent
Ishida et al.

(10) Patent No.: US 8,105,715 B2
(45) Date of Patent: Jan. 31, 2012

(54) HYDROGEN-ABSORBING ALLOY AND NICKEL-METAL HYDRIDE STORAGE BATTERY

(75) Inventors: Jun Ishida, Moriguchi (JP); Yoshifumi Magari, Moriguchi (JP); Shigekazu Yasuoka, Moriguchi (JP)

(73) Assignee: SANYO Electric Co., Ltd., Osaka (JP)

( * ) Notice: Subject to any disclaimer, the term of this patent is extended or adjusted under 35 U.S.C. 154(b) by 565 days.

(21) Appl. No.: 12/230,554

(22) Filed: Aug. 29, 2008

(65) Prior Publication Data
US 2009/0061318 A1 Mar. 5, 2009

(30) Foreign Application Priority Data

Aug. 30, 2007 (JP) .................................. 2007-223602
May 23, 2008 (JP) .................................. 2008-135867

(51) Int. Cl.
*H01M 4/58* (2010.01)
(52) U.S. Cl. ........................ 429/218.2; 420/402; 420/441
(58) Field of Classification Search ................ 429/218.2; 420/402, 441
See application file for complete search history.

(56) References Cited

U.S. PATENT DOCUMENTS

| | | | |
|---|---|---|---|
| 6,248,475 B1 | 6/2001 | Hayashida et al. | 429/218.2 |
| 2007/0065721 A1* | 3/2007 | Kihara et al. | 429/218.2 |

FOREIGN PATENT DOCUMENTS

| | | |
|---|---|---|
| JP | HEI-11-162459 | 6/1999 |
| JP | 2000-265229 A | 9/2000 |
| JP | 2002-105563 A | 4/2002 |
| JP | 2004115870 * | 4/2004 |

OTHER PUBLICATIONS

JP-2004115870—Translation.*

* cited by examiner

*Primary Examiner* — Patrick Ryan
*Assistant Examiner* — Ladan Mohaddes
(74) *Attorney, Agent, or Firm* — Kubovcik & Kubovcik

(57) ABSTRACT

A hydrogen absorbing alloy is provided that is represented by the general formula $Ln_{1-x}Mg_xNi_yA_z$, where: Ln is at least one element selected from the group consisting of Ca, Zr, Ti, and rare-earth elements including Y; A is at least one element selected from the group consisting of Co, Mn, V, Cr, Nb, Al, Ga, Zn, Sn, Cu, Si, P, and B; and x, y, and z satisfy the following conditions $0.05 \leqq x \leqq 0.25$, $0 < z \leqq 1.5$, and $2.8 \leqq y+z \leqq 4.0$, wherein Ln contains 20 mole % or more of Sm.

8 Claims, 3 Drawing Sheets

[Fig. 1]
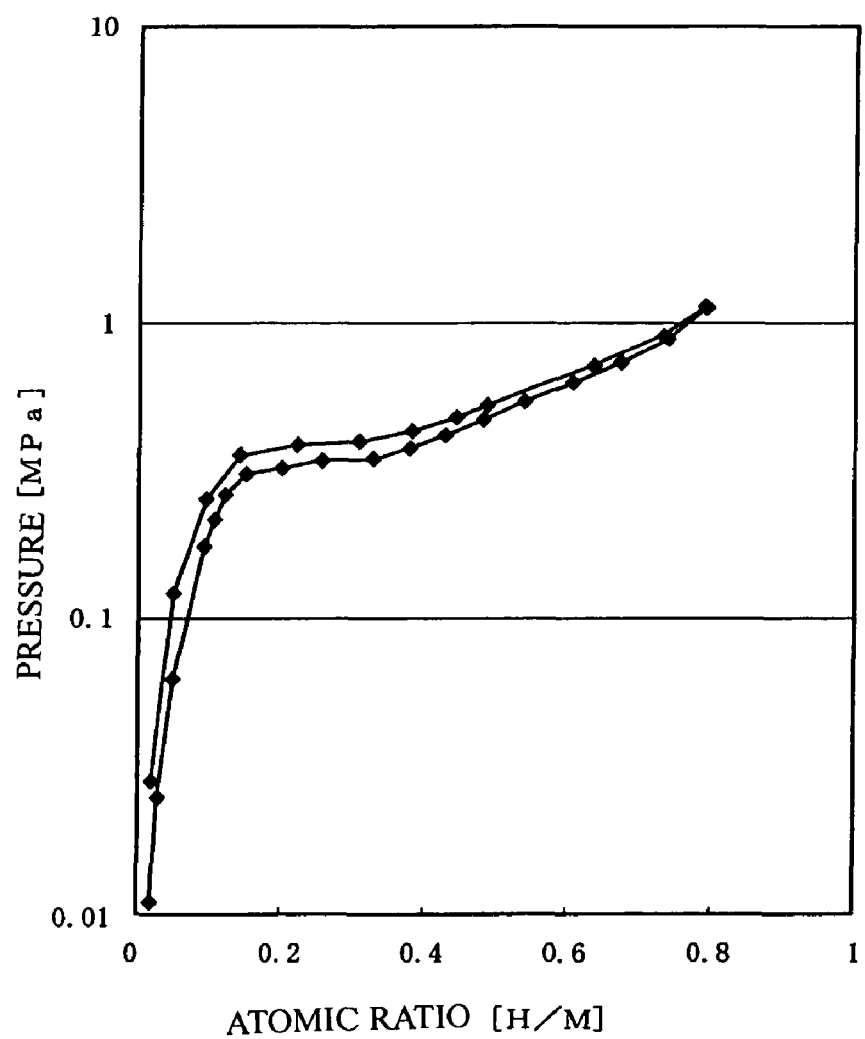

[Fig. 2]
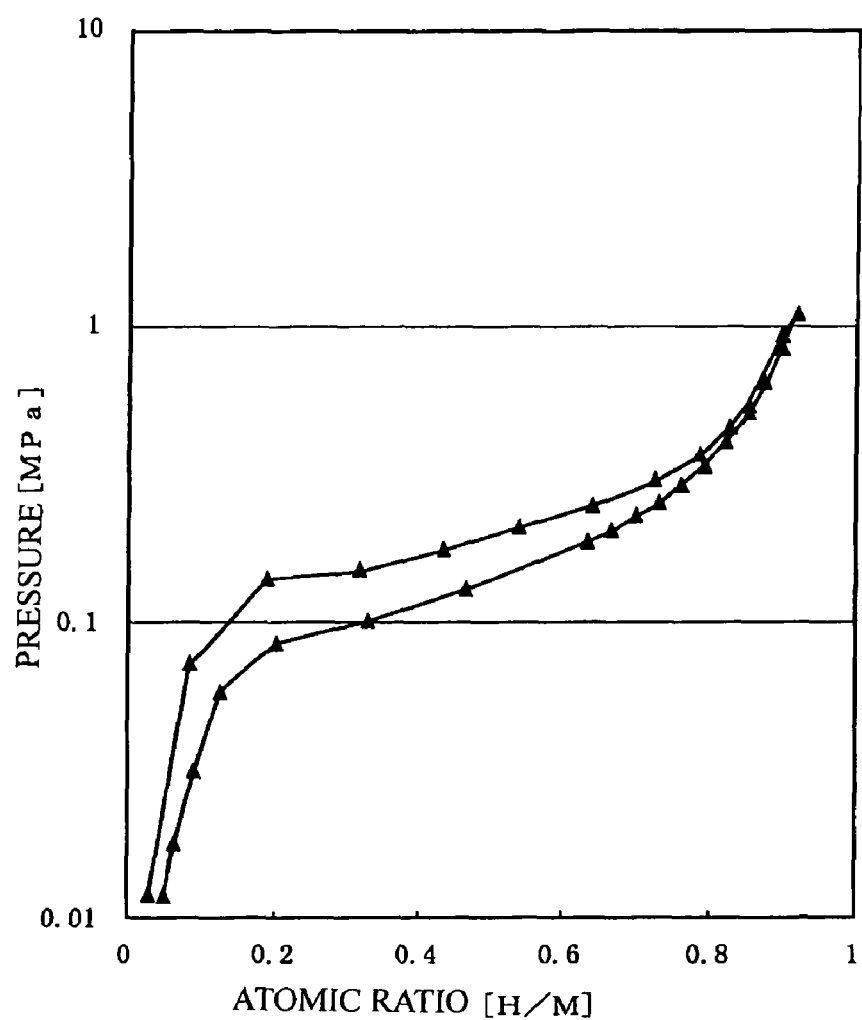

[Fig. 3]
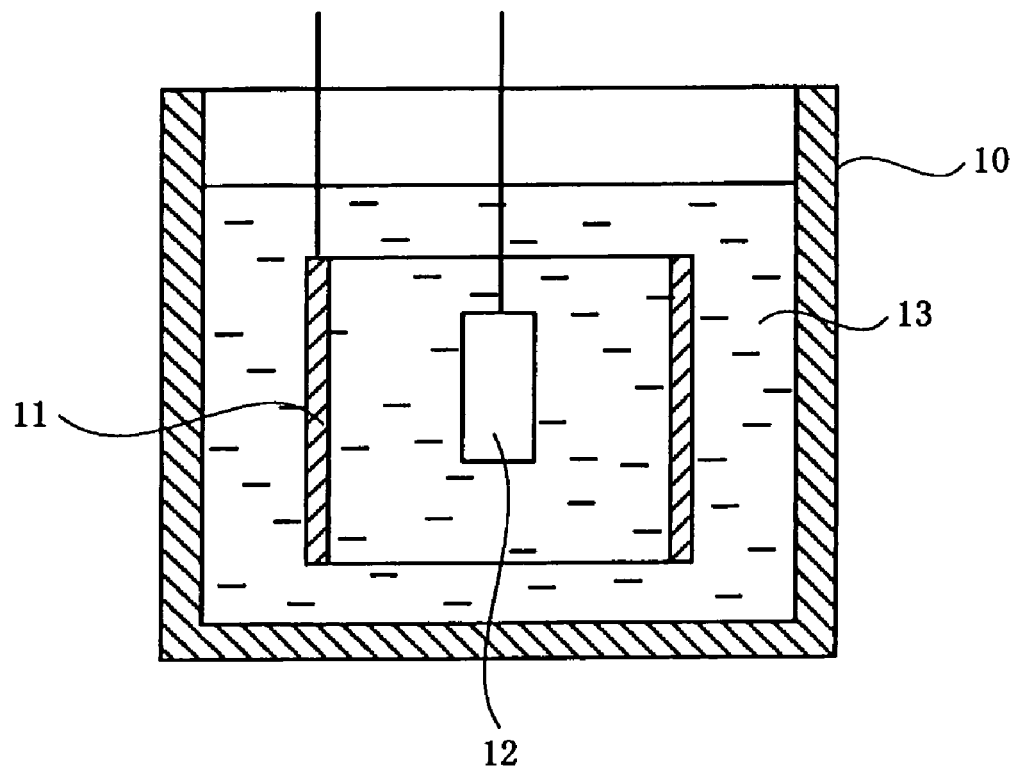

HYDROGEN-ABSORBING ALLOY AND NICKEL-METAL HYDRIDE STORAGE BATTERY

BACKGROUND OF THE INVENTION

1. Field of the Invention

The present invention relates to hydrogen-absorbing alloys used for, for example, negative electrode active materials in negative electrodes of nickel-metal hydride storage batteries and heat pumps, and a nickel-metal hydride storage battery employing such a hydrogen-absorbing alloy for the negative electrode. More particularly, the invention provides a hydrogen-absorbing alloy that can be effectively used for, for example, a heat pump or a negative electrode active material in the negative electrode of a nickel-metal hydride storage battery.

2. Description of Related Art

Conventionally, hydrogen-absorbing alloys have been used in various fields, such as heat pumps and negative electrode active materials in negative electrodes of nickel-metal hydride storage batteries.

The hydrogen absorbing alloys commonly used for the negative electrode active materials of nickel-metal hydride storage batteries include rare earth-Ni hydrogen absorbing alloys having a $CaCu_5$ crystal structure as its main phase, and $AB_2$ Laves phase hydrogen absorbing alloys containing Ti, Zr, V, and Ni.

In recent years, the nickel-metal hydride storage batteries have been used in various applications such as various portable devices and hybrid electric automobiles. As a result, the demand for higher capacity in the nickel-metal hydride storage batteries has been increasing, and likewise, the demand for higher performance in heat pumps has been rising.

However, since the hydrogen absorbing alloys mentioned above do not have sufficient hydrogen-absorbing capability, it has been difficult to achieve sufficient capacity in nickel-metal hydride storage batteries, and it has also difficult to achieve higher performance in heat pumps.

In recent years, it has been found that a hydrogen absorbing alloy having a $Ce_2Ni_7$ type or a $CeNi_3$ type crystal structure, rather than the $CaCu_5$ type, obtained by adding Mg or the like to a rare earth-Ni hydrogen absorbing alloy having the $CaCu_5$ crystal structure as its main phase, achieves higher hydrogen-absorbing capability than the conventional rare earth-Ni hydrogen absorbing alloys. For example, Japanese Published Unexamined Patent Application 11-162459A proposes the use of such a rare earth-Mg—Ni hydrogen absorbing alloy for, for example, the negative electrode active material in the negative electrode of a nickel-metal hydride storage battery.

The just-described rare earth-Mg—Ni hydrogen absorbing alloy, however, shows a larger hysteresis between the pressure changes during the hydrogen absorption and during the hydrogen desorption than the rare earth-nickel hydrogen absorbing alloy having a $CaCu_5$ crystal structure as its main phase. The pressure during desorption of hydrogen becomes lower than the pressure during absorption of hydrogen, and also the hydrogen absorbing alloy tends to deteriorate easily. Consequently, the problems arise that, when the rare earth-Mg—Ni hydrogen absorbing alloy is used for the negative electrode of a nickel-metal hydride storage battery, the battery discharge voltage lowers, and the hydrogen absorbing alloy deteriorates due to the charge-discharge operations, resulting in deterioration in the battery cycle performance.

In addition, when the just-mentioned rare earth-Mg—Ni hydrogen absorbing alloy is used for a heat pump, the problems arise that the use temperature range is limited since the cooling and heating capability of the heat pump is low, and that the efficiency of the heat pump becomes poor since the amount of available heat is small.

In recent years, it has been proposed to limit the amount of Ce relative to that of La in the rare earth-Mg—Ni hydrogen absorbing alloy to less than a predetermined amount to enhance the degree of uniformity of Mg concentration in the hydrogen absorbing alloy so that the difference in equilibrium pressure between the hydrogen absorption process and the hydrogen desorption process can be reduced. This helps to prevent the discharge voltage from lowering when the rare earth-Mg—Ni hydrogen absorbing alloy is used for the negative electrode of a nickel-metal hydride storage battery. (See, for example, Japanese Published Unexamined Patent Application 2000-265229.)

Nevertheless, even when the amount of Ce relative to La in the rare-earth-Mg—Ni hydrogen absorbing alloy is limited to less than a predetermined amount to enhance the degree of uniformity of Mg concentration in the hydrogen absorbing alloy, it has still been difficult to sufficiently reduce the difference in equilibrium pressure between the hydrogen absorption process and the hydrogen desorption process.

BRIEF SUMMARY OF THE INVENTION

It is an object of the present invention to solve the foregoing and other issues in the rare earth-Mg—Ni hydrogen absorbing alloy. Specifically, it is an object of the invention to provide a hydrogen absorbing alloy that can be effectively used for a heat pump and a negative electrode active material in the negative electrode of a nickel-metal hydride storage battery, by improving the rare earth-Mg—Ni hydrogen absorbing alloy so as to reduce the hysteresis between the pressure changes during the hydrogen absorption and during the hydrogen desorption. Also, it is another object of the present invention to provide a nickel-metal hydride storage battery employing a hydrogen absorbing alloy for the negative electrode, which can prevent lowering of the discharge voltage and cycle performance deterioration resulting from degradation of the hydrogen absorbing alloy due to the charge-discharge processes.

In order to accomplish the foregoing and other aspects, the present invention provides a hydrogen-absorbing alloy represented by the general formula $Ln_{1-x}Mg_xNi_yA_z$, wherein: Ln is at least one element selected from the group consisting of Ca, Zr, Ti, and rare-earth elements including Y; A is at least one element selected from the group consisting of Co, Mn, V, Cr, Nb, Al, Ga, Zn, Sn, Cu, Si, P, and B; x, y, and z satisfy the following conditions $0.05 \leq x \leq 0.25$, $0 < z \leq 1.5$, and $2.8 \leq y+z \leq 4.0$, and wherein Ln contains 20 mole % or more of Sm.

It is preferable that the mole ratio x of Mg in the general formula satisfies the condition $0.1 \leq x$, and Ln in the general formula contains La.

The present invention also provides, in order to accomplish the foregoing and other objects, a nickel-metal hydride storage battery comprising a nickel-metal hydride storage battery comprising a positive electrode, a negative electrode, and an alkaline electrolyte solution, the negative electrode comprising the above-described hydrogen absorbing alloy.

BRIEF DESCRIPTION OF THE DRAWINGS

FIG. 1 is a graph showing a PCT curve measured using the hydrogen-absorbing alloy powder of Example 1;

FIG. 2 is a graph showing a PCT curve measured using the hydrogen-absorbing alloy powder of Comparative Example 1; and FIG. 3 is a schematic illustrative drawing of a test nickel-metal hydride storage battery used for Examples 1, 4, and 5 as well as Comparative Examples 1 and 2, in which a hydrogen-absorbing alloy powder is used for the negative electrode.

DETAILED DESCRIPTION OF THE INVENTION

In the case of the rare earth-Mg—Ni hydrogen absorbing alloy described earlier, the hysteresis between the pressure changes during the hydrogen absorption and during the hydrogen desorption increases in the following manner. Hydrogen enters the crystal lattice during absorption of hydrogen, causing strain in the crystal structure. The hydrogen absorbing alloy is changed into a stable crystal structure in a hydrogenated state. This hinders the absorbed hydrogen from being desorbed easily. As a consequence, the pressure during desorption of hydrogen becomes lower than the pressure during absorption of hydrogen, increasing the hysteresis between the pressure changes during the hydrogen absorption and during the hydrogen desorption.

The hydrogen-absorbing alloy according the invention is represented by the general formula $Ln_{1-x}Mg_xNi_yA_z$, wherein: Ln is at least one element selected from the group consisting of Ca, Zr, Ti, and rare-earth elements including Y; A is at least one element selected from the group consisting of Co, Mn, V, Cr, Nb, Al, Ga, Zn, Sn, Cu, Si, P, and B; x, y, and z satisfy the following conditions $0.05 \leq x \leq 0.25$, $0 < z \leq 1.5$, and $2.8 \leq y+z \leq 4.0$. In the present invention, Ln contains 20 mole % or more of Sm. The Sm contained in the hydrogen absorbing alloy serves to prevent strain or the like in the crystal structure of the hydrogen absorbing alloy when hydrogen is absorbed in the hydrogen absorbing alloy. Therefore, it becomes possible to prevent the pressure during desorption of hydrogen from lowering with respect to the pressure during absorption of hydrogen.

As a result, the hydrogen absorbing alloy according to the present invention makes it possible to reduce the hysteresis between the pressure changes during the hydrogen absorption and during the hydrogen desorption. Therefore, when used for the negative electrode of a nickel-metal hydride storage battery, the hydrogen absorbing alloy according to the present invention prevents lowering of the discharge voltage and poor cycle performance that originates from the deterioration of the hydrogen absorbing alloy due to charge-discharge operations. Moreover, when used for a heat pump, the hydrogen absorbing alloy serves to improve the efficiency of the heat pump.

In the hydrogen absorbing alloy represented by the foregoing general formula, the hydrogen-absorbing capability considerably decreases when the mole ratio x of Mg is less than 0.05. For this reason, it is necessary that the mole ratio x of Mg satisfy the condition $0.05 \leq x$. Moreover, when the mole ratio x of Mg satisfies the condition $0.1 \leq x$, the proportion of Mg in the hydrogen absorbing alloy is sufficiently large. Therefore, the hydrogen-absorbing capability of the hydrogen absorbing alloy increases, and the equilibrium pressure becomes high, making it possible to obtain greater energy.

On the other hand, when the mole ratio x of Mg is greater than 0.25, the durability of the alloy becomes poor, so pulverization of the alloy is accelerated during hydrogen absorption and desorption. The pulverization of the alloy results in deterioration in the cycle life performance in the case of battery. In the case of a heat pump, it hinders heat conduction and reduces the reaction speed. Therefore, it is necessary that the mole ratio of Mg satisfy the condition $0.05 \leq x \leq 0.25$. More desirably, the mole ratio of Mg should satisfy the condition $0.1 \leq x \leq 0.25$.

In addition, when the mole ratio x of Mg satisfies the condition $0.1 \leq x$ in the hydrogen absorbing alloy represented by the foregoing general formula, the proportion of Mg in the hydrogen absorbing alloy is sufficiently large. Therefore, the hydrogen-absorbing capability of the hydrogen absorbing alloy increases, and the equilibrium pressure becomes high, making it possible to obtain greater energy.

In addition, when the hydrogen absorbing alloy is allowed to contain a large proportion of Mg and also the Ln in the general formula is allowed to contains Sm or La in a large amount, the material cost of the hydrogen absorbing alloy can be reduced in comparison with a hydrogen absorbing alloy in which Ln contains expensive materials such as Pr or Nd in a large amount. At the same time, when hydrogen is absorbed in the hydrogen absorbing alloy, strain or the like in the crystal structure of the hydrogen absorbing alloy can be inhibited, and also, greater energy can be obtained. Thus, it becomes possible to provide a hydrogen absorbing alloy that can absorb hydrogen in a large amount at low cost.

EXAMPLES

Hereinbelow, examples of the hydrogen absorbing alloy according to the present invention will be described in detail along with comparative examples. Also, it will be demonstrated that the examples of the hydrogen absorbing alloy according to the present invention are capable of preventing the pressure during desorption of hydrogen from lowering with respect to the pressure during absorption of hydrogen, and thereby reducing the hysteresis between the pressure changes during the hydrogen absorption and during the hydrogen desorption. Moreover, the hydrogen absorbing alloy according to the present invention, when used for the negative electrode of a nickel-metal hydride storage battery, is capable of preventing deterioration in cycle performance originating from deterioration of the hydrogen absorbing alloy due to charge-discharge operations. It should be construed that the hydrogen absorbing alloy and the nickel-metal hydride storage battery are not limited to those shown in the following examples, but various changes and modifications are possible without departing from the scope of the invention.

Example 1

In Example 1, samarium Sm alone was used as the Ln in the foregoing general formula. Samarium Sm, magnesium Mg, nickel Ni, and aluminum Al were mixed to obtain a predetermined alloy composition, and the mixture was fused using a high frequency induction furnace and thereafter cooled, to thus prepare an ingot of hydrogen absorbing alloy having the composition $(Sm_{1.00})_{0.90}Mg_{0.10}Ni_{3.33}Al_{0.17}$, as shown in Table 1 below. The composition of the hydrogen absorbing alloy was determined by inductively coupled plasma spectrometry (ICP).

Subsequently, the ingot of the hydrogen-absorbing alloy was sintered at 1,000° C. for 10 hours in an argon atmosphere. Thereafter the ingot of the hydrogen-absorbing alloy was mechanically pulverized in an inert atmosphere, and then classified, whereby hydrogen-absorbing alloy powder with the foregoing composition was obtained. Then, the resultant hydrogen-absorbing alloy powder was analyzed by a laser diffraction/scattering particle size analyzer to determine its particle size distribution. As a result, the particle size obtained at the mean value of weight was found to be 65 μm.

Examples 2 to 4

In Examples 2 to 4, hydrogen absorbing alloy powders of Examples 2 to 4 were obtained in the same manner as described in Example 1 above, except that the Ln in the foregoing general formula was composed of samarium Sm and neodymium Nd, and that samarium Sm, neodymium Nd, magnesium Mg, nickel Ni, and aluminum Al were mixed to obtain a predetermined alloy composition.

Here, the compositions of the hydrogen absorbing alloys of Examples 2 to 4 were analyzed by inductively coupled plasma spectrometry (ICP). As a result, the compositions of the hydrogen absorbing alloys were found to be $(Sm_{0.60}Nd_{0.40})_{0.90}Mg_{0.10}N_{3.33}Al_{0.17}$ for Example 2, $(Sm_{0.40}Nd_{0.60})_{0.90}Mg_{0.10}Ni_{3.33}Al_{0.17}$ for Example 3, and $(Sm_{0.20}Nd_{0.80})_{0.90}Mg_{0.10}Ni_{3.33}Al_{0.17}$ for Example 4, as shown in Table 1 below. Then, the resultant hydrogen-absorbing alloy powders were analyzed by a laser diffraction/scattering particle size analyzer to determine their particle size distribution. As a result, in each of the hydrogen-absorbing alloy powders, the particle size obtained at the mean value of weight was found to be 65 μm.

Comparative Example 1

In Comparative Example 1, hydrogen absorbing alloy powder of Comparative Example 1 was obtained in the same manner as described in Example 1 above, except that neodymium Nd alone was used as the Ln in the foregoing general formula, without using samarium Sm, and that neodymium Nd, magnesium Mg, nickel Ni, and aluminum Al were mixed to obtain a predetermined alloy composition.

The composition of the hydrogen absorbing alloy of Comparative Example 1 was analyzed by inductively-coupled plasma spectrometry (ICP). As a result, the composition was found to be $(Nd_{1.00})_{0.90}Mg_{0.10}N_{3.33}Al_{0.17}$. Then, this hydrogen-absorbing alloy powder was analyzed by a laser diffraction/scattering particle size analyzer to determine its particle size distribution. As a result, the particle size obtained at the mean value of weight was found to be 65 μm.

Then, hydrogen absorption and desorption processes were carried out repeatedly for the hydrogen absorbing alloy powders of Examples 1 to 4 and Comparative Example 1, obtained in the above-described manners, so that the hydrogen absorbing alloy powders were activated.

For each of the activated hydrogen absorbing alloy powders, PCT curve measurement was conducted at 80° C. according to the method specified in JIS H7201 "Measurement method for Pressure-Composition Isotherm (PCT curve) for hydrogen absorbing alloy." The measurement results for the hydrogen absorbing alloy powder of Example 1 are show in FIG. 1, and the measurement results for the hydrogen absorbing alloy powder of Comparative Example 1 are shown in FIG. 2.

In addition, absorption pressure Pa and desorption pressure Pd at Hydrogen/Metal(H/M)=0.4 were obtained for each of the hydrogen absorbing alloy powders, and hysteresis factor Hf=ln(Pa/Pd) for each of the hydrogen absorbing alloy powders was calculated. The results are shown in Table 1 below.

TABLE 1

| | Hydrogen absorbing alloy | | |
|---|---|---|---|
| | Composition | Sm in Ln (mole %) | Hf |
| Ex. 1 | $(Sm_{1.00})_{0.90}Mg_{0.10}Ni_{3.33}Al_{0.17}$ | 100 | 0.129 |
| Ex. 2 | $(Sm_{0.60}Nd_{0.40})_{0.90}Mg_{0.10}Ni_{3.33}Al_{0.17}$ | 60 | 0.157 |
| Ex. 3 | $(Sm_{0.40}Nd_{0.60})_{0.90}Mg_{0.10}Ni_{3.33}Al_{0.17}$ | 40 | 0.218 |
| Ex. 4 | $(Sm_{0.20}Nd_{0.80})_{0.90}Mg_{0.10}Ni_{3.33}Al_{0.17}$ | 20 | 0.260 |
| Comp. Ex. 1 | $(Nd_{1.00})_{0.90}Mg_{0.10}Ni_{3.33}Al_{0.17}$ | 0 | 0.361 |

These results clearly demonstrate the following. The hydrogen absorbing alloy powders of Examples 1 to 4, in which the Ln in the foregoing general formula contained samarium Sm in an amount of 20 mole % or more, exhibited less hysteresis factors Hf than the hydrogen absorbing alloy powder of Comparative Example 1, in which Ln did not contain samarium Sm but contained neodymium Nd alone. Thus, the hysteresis between the pressure changes during the hydrogen absorption and during the hydrogen desorption was reduced and the difference in equilibrium pressure between the hydrogen absorption process and the hydrogen desorption process was lessened in the hydrogen absorbing alloy powders of Examples 1 to 4.

In addition, as the amount of samarium Sm in Ln increased, the hysteresis factor Hf decreased, and the difference in equilibrium pressure between the hydrogen absorption process and the hydrogen desorption process became less.

Then, negative electrodes were prepared as follows, using each of the hydrogen absorbing alloy powders of Examples 1, 4 and Comparative Example 1 obtained in the above-described manners. First, 3 parts by weight of nickel powder as a conductive agent was added to 1 part by weight of each of the hydrogen absorbing alloy powders. The mixtures were mixed together and then pressure formed in a pellet form, to prepare negative electrodes using the hydrogen absorbing alloy powders of Examples 1, 4 and Comparative Example 1.

Meanwhile, positive electrodes having excess capacity relative to the negative electrodes were prepared. Each of the positive electrodes was a sintered nickel electrode formed in a tubular shape. For the alkaline electrolyte solution, 7 mol/L of KOH aqueous solution was used. Using the positive electrodes, the electrolyte solution, and the negative electrodes, test nickel-hydrogen storage batteries were prepared, each of which was negative-limited with a capacity of 90 mAh.

As illustrated in FIG. 3, in each of the test nickel-hydrogen storage batteries, the alkaline electrolyte solution 13 was filled in a container 10 made of polypropylene. The negative electrode 12 was placed in the positive electrode 11 formed in a tubular shape, and the positive electrode 11 and the negative electrode 12 were immersed in the alkaline electrolyte solution 13.

Each of the test nickel-hydrogen storage batteries using the above-described respective negative electrodes was charged at a current of 45 mA in an atmosphere at 250 for 170 minutes, then rested for 20 minutes, then discharged at a current of 45 mA until the battery voltage reached 0.8 V, and then rested for 10 minutes. This charge-discharge cycle was repeated 50 times to obtain the maximum discharge capacity $Q_{max}$ and the discharge capacity $Q_{50}$ after 50 cycles of each of the test nickel-hydrogen storage batteries.

As the amount of capacity deterioration in each of the test nickel-hydrogen storage batteries, the difference ($Q_{max}-Q_{50}$) between the maximum discharge capacity $Q_{max}$ and the discharge capacity $Q_{50}$ after 50 cycles was determined for each of the test nickel-hydrogen storage batteries. The amounts of capacity deterioration for the test nickel-hydrogen storage batteries using the hydrogen absorbing alloys of Example 4 and Comparative Example 1 were calculated by taking the amount of capacity deterioration of the test nickel-hydrogen storage battery using the hydrogen absorbing alloy of Example 1 as 100. The results are shown in Table 2 below.

TABLE 2

| | Hydrogen absorbing alloy | | Amount of |
| --- | --- | --- | --- |
| | Composition | Sm in Ln (mole %) | Hf | battery capacity deterioration |
| Ex. 1 | $(Sm_{1.00})_{0.90}Mg_{0.10}Ni_{3.33}Al_{0.17}$ | 100 | 0.129 | 100 |
| Ex. 4 | $(Sm_{0.20}Nd_{0.80})_{0.90}Mg_{0.10}Ni_{3.33}Al_{0.17}$ | 20 | 0.260 | 104 |
| Comp. Ex. 1 | $(Nd_{1.00})_{0.90}Mg_{0.10}Ni_{3.33}Al_{0.17}$ | 0 | 0.361 | 131 |

The results clearly demonstrate the following. The test nickel-hydrogen storage batteries that employed the negative electrodes comprising the hydrogen absorbing alloy powders of Examples 1 and 4, in which the Ln in the general formula contained 20 mole % or more of samarium Sm, exhibited significantly lower amounts of capacity deterioration than the test nickel-hydrogen storage battery that employed the negative electrode comprising the hydrogen absorbing alloy powder of Comparative Example 1, in which Ln contained no samarium Sm but contained neodymium Nd alone. Thus, the hydrogen absorbing alloy was prevented from deteriorating and the cycle performance was improved in the test nickel-hydrogen storage batteries using the hydrogen absorbing alloy powders of Examples 1 and 4.

Example 5

In Example 5, hydrogen absorbing alloy powder of Example 5 was obtained in the same manner as described in Example 1 above, except that the Ln in the foregoing general formula was composed of samarium Sm and lanthanum La, and that samarium Sm, lanthanum La, magnesium Mg, nickel Ni, and aluminum Al were mixed to obtain a predetermined alloy composition.

The composition of the hydrogen absorbing alloy of Example 5 was analyzed by inductively-coupled plasma spectrometry (ICP). As a result, the composition was found to be $(Sm_{0.80}La_{0.20})_{0.90} Mg_{0.10}Ni_{3.33}Al_{0.17}$. Then, this hydrogen-absorbing alloy powder was analyzed by a laser diffraction/scattering particle size analyzer to determine its particle size distribution. As a result, the particle size obtained at the mean value of weight was found to be 65 µm.

Comparative Example 2

In Comparative Example 2, the hydrogen absorbing alloy powder of Comparative Example 2 was obtained in the same manner as described in Example 1 above, except that lanthanum La alone was used as the Ln in the foregoing general formula without using samarium Sm, and that lanthanum La, magnesium Mg, nickel Ni, and aluminum Al were mixed to obtain a predetermined alloy composition.

The composition of the hydrogen absorbing alloy of Comparative Example 2 was analyzed by inductively-coupled plasma spectrometry (ICP). As a result, the composition was found to be $(La_{1.00})_{0.90}Mg_{0.10}Ni_{3.33}Al_{0.17}$. Then, this hydrogen-absorbing alloy powder was analyzed by a laser diffraction/scattering particle size analyzer to determine its particle size distribution. As a result, the particle size obtained at the mean value of weight was found to be 65 µm.

Then, hydrogen absorption and desorption processes were carried out repeatedly for the hydrogen absorbing alloy powders of Example 5 and Comparative Example 2, obtained in the above-described manners, so that the hydrogen absorbing alloy powders were activated.

For each of the activated hydrogen absorbing alloy powders, PCT curve measurement was conducted at 80° C. according to the method specified in JIS H7201 "Measurement method for Pressure-Composition Isotherm (PCT curve) for hydrogen absorbing alloy," as in the foregoing. Also, absorption pressure Pa and desorption pressure Pd at H/M=0.4 were obtained for each of the hydrogen absorbing alloy powders, and hysteresis factor Hf=ln (Pa/Pd) for each of the hydrogen absorbing alloy powders was calculated. The results are shown in Table 3 below.

Then, negative electrodes were prepared as follows, using each of the hydrogen absorbing alloy powders of Example 5 and Comparative Example 2 obtained in the above-described manners. First, 3 parts by weight of nickel powder as a conductive agent was added to 1 part by weight of each of the hydrogen absorbing alloy powders. The mixtures were mixed together and then pressure formed in a pellet form, to prepare negative electrodes using the hydrogen absorbing alloy powders of Example 5 and Comparative Example 2. The negative electrode had a capacity of about 90 mAh using 0.25 g of the hydrogen-absorbing alloy. Using the negative electrodes thus prepared and enough capacity of positive electrode, test nickel-hydrogen storage batteries were prepared, each of which was negative-limited, in the same manner as in the foregoing.

Each of the test nickel-hydrogen storage batteries using the above-described respective negative electrodes was charged at a current of 45 mA in an atmosphere at 250 for 170 minutes, then rested for 20 minutes, then discharged at a current of 45 mA until the battery voltage reached 0.8 V, and then rested for 10 minutes. This charge-discharge cycle was repeated 10 times to obtain the maximum discharge capacity $Q_{max}$ and the discharge capacity $Q_{10}$ after 10 cycles of each of the test nickel-hydrogen storage batteries.

As the amount of capacity deterioration in each of the test nickel-hydrogen storage batteries, the difference ($Q_{max}-Q_{10}$) between the maximum discharge capacity $Q_{max}$ and the discharge capacity $Q_{10}$ after 10 cycles was determined for each of the test nickel-hydrogen storage batteries. The amount of capacity deterioration for the test nickel-hydrogen storage-battery using the hydrogen absorbing alloy of Comparative Example 2 was calculated by taking the amount of capacity deterioration of the test nickel-hydrogen storage battery using the hydrogen absorbing alloy of Example 5 as 100. The results are shown in Table 3 below.

TABLE 3

| | Hydrogen absorbing alloy | | | Amount of |
| --- | --- | --- | --- | --- |
| | Composition | Sm in Ln (mole %) | Hf | battery capacity deterioration |
| Ex. 5 | $(Sm_{0.80}La_{0.20})_{0.90}Mg_{0.10}Ni_{3.33}Al_{0.17}$ | 80 | 0.325 | 100 |
| Comp. Ex. 2 | $(La_{1.00})_{0.90}Mg_{0.10}Ni_{3.33}Al_{0.17}$ | 0 | 0.766 | 1529 |

These results clearly demonstrate the following. The hydrogen absorbing alloy powder of Comparative Example 2, in which the Ln in the foregoing general formula contained no samarium Sm but contained lanthanum La alone, exhibited a very high hysteresis factor Hf. In contrast, the hydrogen absorbing alloy powder of Example 5, in which Ln contained samarium Sm in an amount of 20 mole % or more in addition to lanthanum La, exhibited a significantly less hysteresis factor Hf. Thus, the hysteresis between the pressure changes during the hydrogen absorption and during the hydrogen desorption was reduced and the difference in equilibrium pressure between the hydrogen absorption process and the hydrogen desorption process was lessened in the hydrogen absorbing alloy powder of Example 5.

In addition, the test nickel-hydrogen storage batteries that employed the negative electrode comprising the hydrogen absorbing alloy powder of Example 5, in which the Ln in the general formula contained 20 mole % or more of samarium Sm, exhibited a significantly lower amount of capacity deterioration than the test nickel-hydrogen storage battery that employed the negative electrode comprising the hydrogen absorbing alloy powder of Comparative Example 2, in which Ln contained no samarium Sm but contained lanthanum La alone. Thus, the hydrogen absorbing alloy was prevented from deteriorating and the cycle performance was improved in the test nickel-hydrogen storage battery using the hydrogen absorbing alloy powder of Example 5.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

This application claims priority of Japanese patent application Nos. 2007-223602 and 2008-135867 filed Aug. 30, 2007, and May 23, 2008, respectively, which are incorporated herein by reference.

What is claimed is:

1. A hydrogen-absorbing alloy represented by the general formula $Ln_{1-x}Mg_xNi_yA_z$, wherein: Ln is Sm and, optionally, at least one element selected from the group consisting of Ca, Zr, Ti, and rare-earth elements other than Sm including Y; A is at least one element selected from the group consisting of Co, Mn, V, Cr, Nb, Al, Ga, Zn, Sn, Cu, Si, P, and B; x, y, and z satisfy the following conditions $0.05 \leq x \leq 0.25$, $0 < z \leq 1.5$, and $2.8 \leq y+z \leq 4.0$, and wherein Ln contains 20 mole % or more of Sm.

2. The hydrogen-absorbing alloy according to claim 1, wherein the mole ratio x of Mg in the general formula satisfies the condition $0.1 \leq x$.

3. The hydrogen-absorbing alloy according to claim 1, wherein Ln in the general formula contains La.

4. The hydrogen-absorbing alloy according to claim 2, wherein Ln in the general formula contains La.

5. A nickel-metal hydride storage battery comprising a positive electrode, a negative electrode, and an alkaline electrolyte solution, said negative electrode containing a hydrogen-absorbing alloy according to claim 1.

6. A nickel-metal hydride storage battery comprising a positive electrode, a negative electrode, and an alkaline electrolyte solution, said negative electrode containing a hydrogen-absorbing alloy according to claim 2.

7. A nickel-metal hydride storage battery comprising a positive electrode, a negative electrode, and an alkaline electrolyte solution, said negative electrode containing a hydrogen-absorbing alloy according to claim 3.

8. A nickel-metal hydride storage battery comprising a positive electrode, a negative electrode, and an alkaline electrolyte solution, said negative electrode containing a hydrogen-absorbing alloy according to claim 4.

* * * * *